United States Patent

Kammerer

[15] 3,638,092

[45] Jan. 25, 1972

[54] ALTITUDE PRESELECT AND CAPTURE SYSTEM

[72] Inventor: Leo P. Kammerer, Cedar Rapids, Iowa

[73] Assignee: Collins Radio Company, Cedar Rapids, Iowa

[22] Filed: Dec. 14, 1970

[21] Appl. No.: 97,742

[52] U.S. Cl. ............................... 318/584, 318/591, 244/77
[51] Int. Cl. ......................................................... G05b 7/00
[58] Field of Search ........................... 318/591, 584; 244/77

[56] References Cited

UNITED STATES PATENTS

| | | | |
|---|---|---|---|
| 2,855,558 | 10/1958 | Fragola | 318/591 |
| 3,184,667 | 5/1965 | Kufert | 318/591 X |
| 3,510,092 | 5/1970 | Hendrick et al. | 318/591 X |
| 3,521,838 | 7/1970 | Buffum et al. | 318/584 X |

*Primary Examiner*—Benjamin Dobeck
*Attorney*—Richard W. Anderson and Robert J. Crawford

[57] ABSTRACT

An altitude control system operating on a rate command principle employs an uncorrected primary altitude sensor in a servo loop which, in the absence of command operation, synchronizes the positioning of the sensor zero adjust mechanism with the experienced aircraft altitude rate. Rate command modes establish rate command inputs to the sensor servo loop while removing the synchronizing mode position feedback and initiate aircraft vertical control in response to sensor output signal. A corrected sensor may be employed to formulate altitude capture rate command inputs such that the system enjoys the reference accuracy of the corrected sensor and the rate sensitivity of the uncorrected sensor.

12 Claims, 4 Drawing Figures

INVENTOR
LEO P. KAMMERER
BY R.W. Anderson
AGENT

INVENTOR
LEO P. KAMMERER
BY R. W. Anderson
AGENT

ALTITUDE PRESELECT AND CAPTURE SYSTEM

This invention relates generally to automatic vertical path control for an aircraft and more particularly to a control means for capturing and holding a preselected altitude in a system which can also be programmed with a signal from the autopilot control to provide a vertical speed mode.

The least sophisticated of known altitude control systems provide means to merely switch to an altitude hold mode when a desired altitude is reached. The lag of the aircraft response then permits a large excursion beyond the desired altitude and introduces one or more overshoot conditions. During such maneuvers the G forces can become uncomfortable.

More sophisticated altitude control systems use two separate sources of error signal. One source of error signal is employed for an altitude capture maneuver, and a second source is employed for the hold requirement. Typically in these systems a static source error corrected (SSEC) altimeter provides the capture error signal and a noncorrected computer or primary sensor provides the hold signal. In these systems changes in aircraft air speed during altitude hold modes of operation will cause the hold signal to vary and thereby cause the aircraft to change altitude. The SSEC altimeter will then indicate the actual change in altitude which tells the pilot that he is not holding the altitude desired.

In these types of systems the error corrected altimeter such as the SSEC or an altitude signal provided from a central air data computer (CADC) is employed to provide the capture error signal, and an uncorrected primary sensor is employed for holding purposes, since SSEC or CADC altitude sensors are extremely accurate in the long term sense and are corrected for air speed. Thus they provide an accurate reference for a given altitude but inherently are not responsive to short term altitude variations—that is, they inherently have a dead zone in their operating characteristic and as such are not sufficiently responsive to use as an automatic control error reference.

Uncorrected primary altitude sensors, on the other hand, are extremely responsive and accurate for short term variations and thus preferred as a holding function reference. However, uncorrected primary sensors do not provide an accurate altitude indication, and thus are a poor reference to use in capturing a desired altitude.

The primary object of the present invention is the provision of an altitude capture and hold flight control system utilizing an uncorrected sensor for a holding reference in a system where the zero reference for the uncorrected sensor is varied with a corrected sensor. The corrected sensor signal provides a small reference adjustment which keeps the error signal referenced to the correct altitude, and thus provides long term stability.

A further object of the present invention is the provision of an improved altitude capture and hold control system for an aircraft wherein capture is adaptive in nature, and a controlled closure rate maintaining a constant G maneuver and asymptotic approach path is realized.

The present invention is featured in the provision of an adaptive capture system whereby an aircraft may enter an altitude capture mode at any air speed and altitude rate and effect a variable capture point such that the same minimal constant G maneuver will asymptotically bring the aircraft onto the desired altitude.

A still further feature of the present invention is the provision of an altitude capture control system for an aircraft wherein the altitude error command is inherently zero at the time capture is effected, thus obviating abrupt changes in command signal for aircraft control such that the transition of control altitude command will be smooth smooth.

A still further feature of the present invention is the provision of an altitude capture and hold system for an aircraft permitting changes in preselected altitude during a holding mode and attainment of the newly selected altitude at a predetermined minimum closure rate without disengaging and recapturing.

The present invention uniquely combines, in an altitude capture and hold control system, the inherently best characteristics of two types of altitude sensors. A static source error corrected altimeter is employed for its extreme long term accuracy in establishing and effecting the capture of a desired altitude while an uncorrected primary sensor is used to generate altitude error command signal on an accurate short-time basis about the reference established by the accurate SSEC source.

In a general sense then, the control system of the present invention provides advantages analogous to magnetic compass systems employing directional gyros, where the gyro and compass coact to provide optimized accuracy and sensitivity.

The objectives of the present invention might generally be summed as providing (by a combination of adaptive capture, controlled closure rate, and constant closure rate for the last few feet prior to altitude attainment) the quickest possible acquisition of a preselected altitude without pulling excessive G's. Means are also included in the system which permit small changes in a selected altitude and acquisition of the newly selected altitude at a predetermined minimum closure rate without disengaging and recapturing.

These and other objects and features of the present invention will become apparent upon reading the following description with reference to the accompanying drawings in which.

Figure 1:
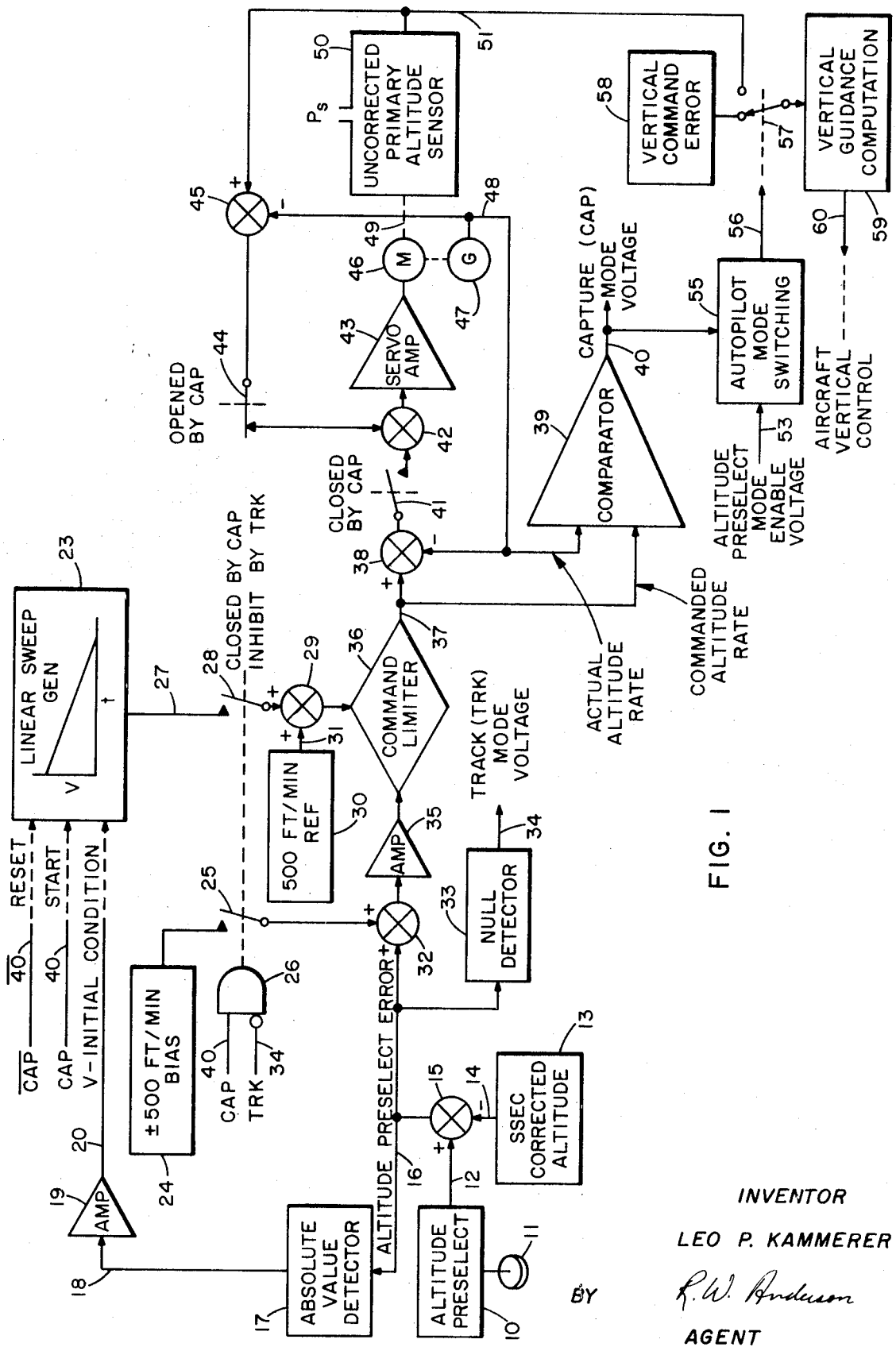
FIG. 1 is a functional block diagram of an altitude preselect and capture system in accordance with the present invention.

With reference to FIG. 1, the preselect and capture system of the present invention operates generally on an altitude rate command basis. Considering first the uncorrected primary altitude sensor 50, and that the pilot has selected an altitude to be captured and is approaching this altitude at a given closure rate in some other autopilot mode such as mach hold, primary sensor 50 will be slewing at the actual aircraft rate of climb. This is effected by a position feedback in which the output 51 of primary sensor 50 is fed back through mixer 45, mode switch 44 (in closed position), and mixer 42 to servoamplifier 43 which drives motor 46 to position the zero reference mechanism of sensor 50. The output of primary sensor 50 is zero under these conditions due to the position feedback. The output 51 from primary sensor, which comprises the altitude error command of the present invention, is disconnected from subsequent autopilot control circuitry, since mode switch 57 is not connected to the sensor output under these conditions. FIG. 1 depicts the vertical control computation circuitry 59 of an autopilot as being under the control of an alternate vertical command error source 58 (for example, a mach hold error signal source) and providing an output 60 to effect aircraft vertical control.

Servomotor 46 drives a generator 47 to provide an output 48 utilized as rate feedback within the loop by its application to mixer 45 where it is applied in a negative feedback sense with the position feedback signal from the output 51. The output 48 from generator 47 is a signal accurately proportional to the particular altitude rate being experienced.

A commanded altitude rate signal is developed as a signal proportional to the difference between a desired altitude to be captured and the actual aircraft altitude as sensed by an SSEC instrument or CADC source. With reference to FIG. 1, a preselected altitude may be set in by control knob 11, in response to which altitude preselect circuitry 10 develops an output signal 12 proportional to the selected altitude. The output from the SSEC or CADC is subtractively combined in a mixer 15 to develop an altitude preselect error signal 16 proportional to the discrepancy between the preselected altitude and the actual aircraft altitude.

The altitude preselect error signal 16 is applied through mixer 32, amplifier 35, and limiter 36 to a mixer 38 where it is mixed with rate signal 48 from generator 47. The output from mixer 38, proportional to the difference between altitude preselect error 16 and altitude rate signal 48, is selectively applied to the primary sensor servo through a further mode switch 41.

The output from mixer 38 is utilized as an altitude rate command signal and is directly proportional to the distance away from the selected altitude and decreases in magnitude as the aircraft approaches the selected altitude. The undamped altitude rate command signal 37 is applied as a first input to a comparator 39 where it is compared in magnitude with the actual altitude rate signal 48 developed by generator 47 in the servoloop Comparator 39 produces a capture mode voltage 40 when (and so long as) the commanded altitude rate 37 at the output of limiter 36 and the actual rate 48 from the servoloop generator 47 are substantially equal. The generation of the capture mode voltage 40 switches the associated flight control system from any employed vertical command error control (such as mach hold) to the altitude error command signal 51 through the tie in between the output 40 of comparator 39 and autopilot mode switching block 55 which develops an output 56 to position mode switch 57 from the source 58 to the altitude error command source 51. The initiation of a capture mode voltage (CAP) at the time when the commanded altitude rate (proportional to the discrepancy between a selected altitude and that actually experienced) equals the actual altitude rate, also opens the position feedback of the servoloop in the primary sensor servo via mode switch 44. When capture mode is initiated, the output 51 from primary sensor 50 is at a null value since the sensor up to that time had been operating as a closed loop position servo. Thus the initial controlling signal 51 applied for subsequent aircraft control commands no abrupt change in control, and the transition to the altitude command mode is smoothly attained.

The capture mode voltage 40, in opening the position feedback in the servo via switch 44 and applying the commanded altitude rate signal 37 through switch 41 to the servo, causes the servo to run at a rate proportional to the distance existing from the selected altitude, that is, the discrepancy between the altitude preselected and that being actually experienced. Thus a variable capture point is realized because the commanded altitude rate signal is not used for control until the preselect error signal indicates that the aircraft must start the capture maneuver.

The discussion thus far has inferred that the altitude preselect error signal 16 is directly applied, at the initiation of the capture mode voltage, as an input to the servo. The application of the preselect error signal, however, is applied through a command limiter 36 the limiting function of which is programmed such that a constant G force is exerted on the aircraft during the altitude capture control and the aircraft captures the preselected altitude asymptotically. Means are also employed to prevent a long asymptotic closure by the inclusion of a minimum closure rate in the program. These features are realized by programming the limiting function of command limiter 36 as a predetermined function of time. Limiter 36 is time controlled by a linear sweep generator 23 the output of which is selectively applied to the limiter through a further mode switch 28.

Mode switch 28 is programmed to be closed during the capture phase so as to apply the linear sweep generator output 23 to control limiter 36 at the initiation of the capture mode voltage. A 500 ft. per minute reference source 30 provides a signal 31 for summing with the linear sweep generator output signal 27 in mixer 29. Linear sweep generator 23 is provided with an initial condition input 20 from an amplifier 19. The altitude preselect error is applied through an absolute value detector 17 to provide an input 18 to amplifier 19. Therefor, the linear sweep generator is preset for an initial voltage output at the time capture mode voltage 40 is generated to a value V, proportional to the absolute value of the altitude preselect error signal.

Linear sweep generator might be any one of a number of implementations to provide a linearly decreasing output voltage over a predetermined period of time from an initial output voltage V which is proportional to the value of the altitude preselect error at the time capture mode is initiated. Sweep from generator 23 may then be so timed that a constant G force is exerted on the aircraft during capture, such as, for example, 0.2 G's. The altitude preselect error 16, as applied through amplifier 35 to limiter 36, is thus limited in accordance with the linear sweep from generator 23 such that the output 37 from limiter 36 is an altitude rate command signal time-programmed for a constant G acquisition of the preselected altitude. The 500 ft. per minute reference source 30 establishes a maximum command rate of 500 ft. per minute after capture to limit subsequent commands.

The control of limiter 36 by linear sweep generator 23 so as to establish an initial limit equal to the magnitude of the altitude preselect error at the time of capture permits an adaptive capture so that capture of the preselected altitude will be effected with a constant G maneuver, regardless of closure rate prior to capture mode.

Figure 2:
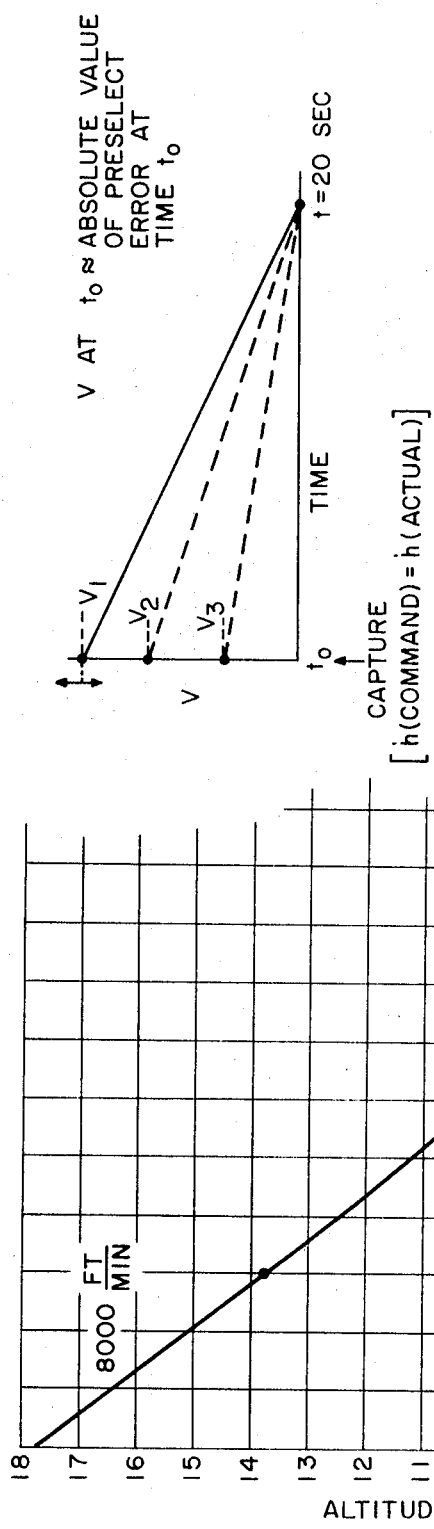
FIG. 2 is a diagrammatic representation of a typical linear sweep generator output waveform employed in the system of FIG. 1.

FIG. 2 illustrates the linear sweep generator 23 output waveform as varying linearly from an initial voltage at capture mode initiation time towards zero voltage over a predetermined time period of, for example, 20 seconds. The initial voltage value of the sweep waveform is established by the absolute value of the altitude preselect error signal at the time that capture mode is initiated. Capture mode is initiated when the output of the controlled limiter through which the commanded altitude rate signal is applied equals the actually experienced altitude rate. Thus upon initiation of the capture mode at time $t_o$ the altitude rate command developed at the output of limiter 36 is applied as an input to servoamplifier 43 to command the servomotor to drive primary sensor 50 reference adjustment at an initial rate proportional to the discrepancy between the selected altitude and the experienced altitude. The rate is then linearly decreased over a 20 second time period by applying the output of the linear sweep generator to the command limiter 36. FIG. 2 illustrates three initial rate limits at the time of capture (VI, V2, and V3—corresponding to proportionally lesser altitude preselect error signals at the time capture mode is initiated). The output of the sweep generator 23 is thus seen to be a variable slope sweep signal decaying from an initial voltage proportional to altitude error to zero in a given period of time.

It is noted that the altitude preselect error signal 16 is mixed with a 500 ft. per minute bias from source 24 during capture by the closing of mode switch 25. This establishes a minimum closure rate of 500 ft. per minute until the altitude is captured and track mode switching occurs. This prevents long asymptotic closure.

When the aircraft attains the preselected altitude, the altitude preselect error signal 16 from mixer 15 is zero, and this null is sensed by null detector 33 to generate a track mode (TRK) voltage output 34. Track mode voltage 34 opens mode switch 25 to remove the 500 ft. per minute bias source and also permits the linear sweep generator 23 to reset through the input 40, but does not affect the 500 ft. per minute limiting since the 500 ft. per minute limit is constantly established by the input 31 from the reference 30 being applied to limiter 36. Thus the pilot may select, after attaining a desired altitude, a new altitude, and the primary sensor 50 will furnish command signals to cause the aircraft to attain the newly selected altitude at a closure rate up to a 500 ft. per minute maximum without disengaging and recapturing.

Figure 3:
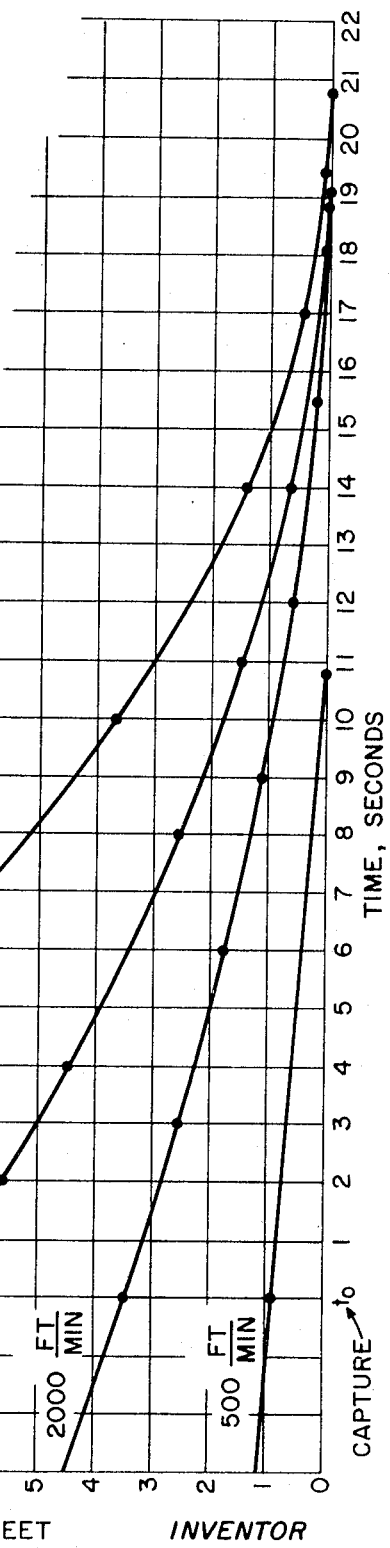
FIG. 3 is a plot of computed capture paths for various approach rates.

FIG. 3 illustrates computed capture paths for several approaches under conditions of varying closure rates. Note that capture mode is initiated at time $t_o$ for proportionally greater altitude errors as the existing closure rate prior to capture increases. For example, the uppermost approach path illustrates the aircraft as closing at 8,000 ft. per minute and capture being initiated at an altitude error of approximately 1,400 ft. Correspondingly, a closure rate of 4,000 ft. per minute prior to capture effects capture mode at approximately 700 ft. altitude error. It is also to be noted that, as the approach rates are lowered, the closure rate never increases, but decreases slowly to 500 ft. per minute.

FIG. 3 thus bears out the adaptive capture feature of the system of the present invention. As above described, capture mode is initiated (time $t_o$) when the commanded rate and the actually experienced rate are equal. The commanded rate is limited via a linear time program. Thus, as closure rate is increased, capture is effected at a proportionally larger altitude error, since the actual rate detected via the slewing servomotor prior to capture is proportionally higher and will accordingly equal the commanded rate and initiate capture at a correspondingly higher value of altitude error.

Thus the initially commanded altitude rate at $t_o$ (capture) is equal to the rate actually being experienced at $t_o$, and is linearly decreased from that value to the preselected 500 ft. per minute minimum over a predetermined time period. This period as depicted in FIG. 3 might be approximately 20 seconds so as to establish a constant G maneuver of 0.2 G during capture.

Thus the capture of a selected altitude is adaptive in nature. The faster the closure rate, the sooner the capture mode is initiated. This is analogous to VOR beam captures which cause bank to be initiated at proportionally greater distances from a selected course as the aircraft velocity is increased.

In addition to the adaptive capture and constant G maneuver realizable by the present invention, the system defined herein uniquely combines the best characteristics of inherently sluggish corrected altitude sensors and inherently low threshold uncorrected sensors having long term inaccuracies. Because the rate command during capture is referenced to the accurate SSEC altitude reference, the command program is accurately oriented. Command output signals during capture are based on the short term accuracy of the primary sensor and a desirable tight control is effecte; to maintain the accurately based command rate.

Thus a low threshold sensor (the primary uncorrected sensor) is programmed to acquire and maintain a preselected altitude which in turn is referenced to the extremely accurate static source error corrected (SSEC) pilot's indicator. In effect an uncorrected sensor is employed for autopilot command signal generation with desired low threshold characteristics, while the long term inaccuracy of this uncorrected sensor is overcome by providing a small reference adjustment via the corrected sensor, thus keeping the low threshold error command signal referenced to the correct altitude and providing long term stability.

Figure 4:
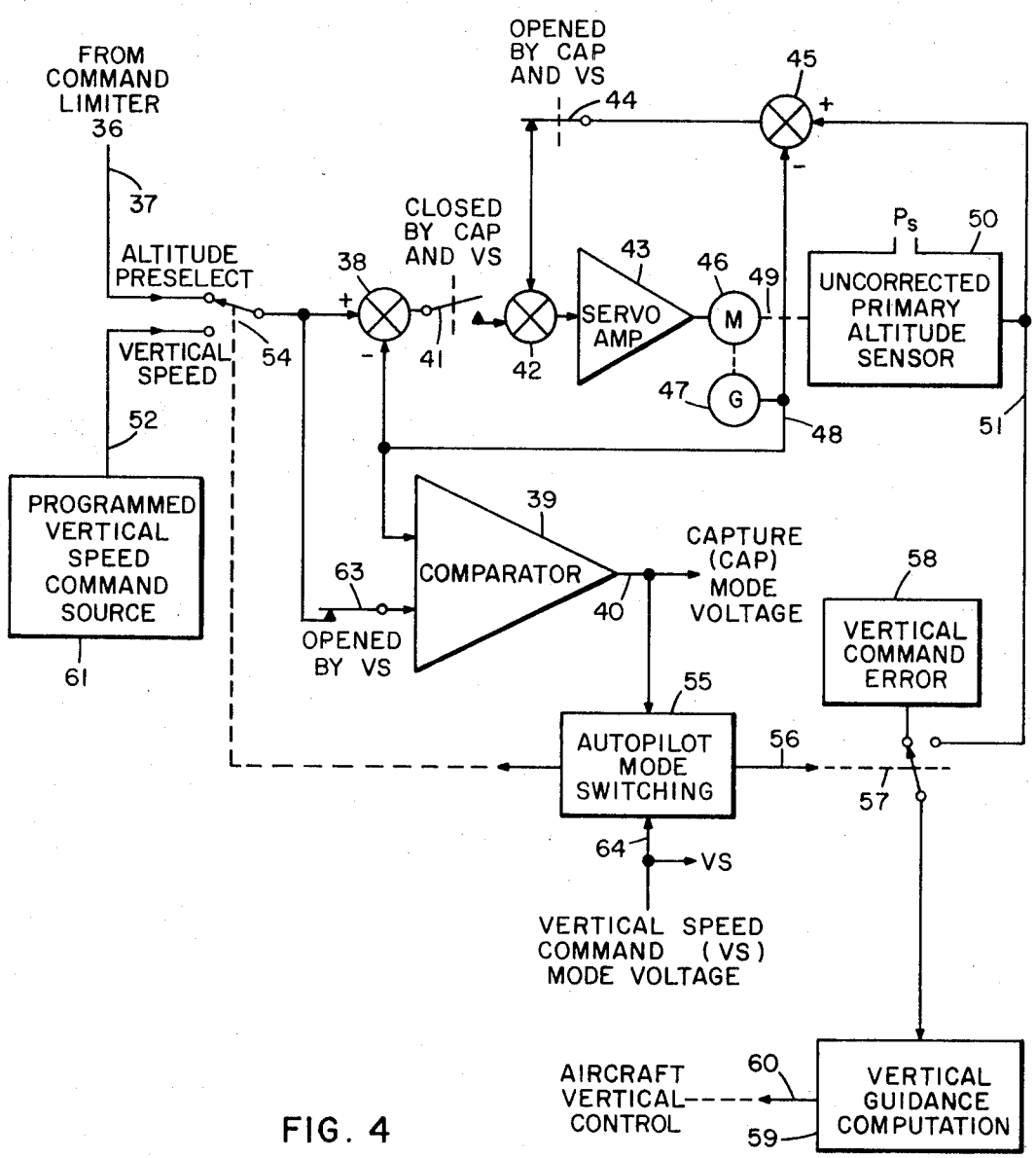
FIG. 4 is a functional modification of the system of FIG. 1 to include a vertical speed command operational mode.

The system for aircraft vertical control as defined herein may additionally be programmed with a signal from the autopilot control to provide a vertical speed mode in lieu of an altitude capture mode. FIG. 4 illustrates the inclusion of this alternate mode into the circuitry of FIG. 1, and functionally indicates logic switching modification by means of which the additional mode may be readily realized. In this instance the commanded altitude rate signal 37 applied to mixer 38 and selectively, through logic switch 41, to the servo, may be switched to a commanded vertical speed signal 52 from a vertical speed command generating source 61. Signal comparator 39 is disabled during the vertical speed mode by opening of logic switch 63 in response to vertical speed mode voltage VS. The position feedback in the servo is disabled by the VS mode voltage opening switch 44. As in the previously discussed mode, the servo, prior to selection of vertical speed mode would be slewing at the actual rate experienced by the aircraft. Upon selection of vertical speed mode by application of vertical speed command mode voltage 64 (VS) to the autopilot mode switching network 55, the servo position feedback is removed by opening of loop switch 44, and the output of mixer 38, corresponding to the discrepancy between the commanded vertical speed signal 52 and that being actually experienced, would be applied through switch 41 (through closing logic effected by VS mode voltage 64) to drive the motor 46, and thus the zero correcting mechanism of the primary altitude sensor 50, at a rate corresponding to the discrepancy between the commanded rate and that being experienced. The output 51 from sensor 50 is applied as command signal for subsequent aircraft vertical control through autopilot mode switch 57. The commanded vertical speed signal 52 in this mode of operation might be constant or might vary with time in accordance with a predetermined program.

Although the present invention has been defined with respect to a particular embodiment thereof, it is not to be so limited as changes might be made therein which fall within the scope of the present invention as defined in the appended claims.

I claim:

1. An altitude preselect and capture system for vertical aircraft control comprising means for developing a first signal proportional to the discrepancy between a preselected altitude to be flown and the actual altitude of said craft as detected by a static source error corrected altitude detector, an uncorrected barometric altitude sensor, said uncorrected sensor including an electromechanical zero adjusting means and an output transducer, the output of said transducer comprising an altitude error command signal, means connecting the output of said uncorrected sensor selectively as an input signal to a servoamplifier, a servomotor receiving the output from said servoamplifier, said motor connected to and driving the zero adjusting means of said uncorrected sensor, generator means rotatably driven by said servomotor, the output of said generator means being degeneratively combined with the output from said uncorrected sensor output transducer as selectively applied to the input of said servoamplifier, the output of said generator means and said first signal being applied as respective inputs to a further degenerative combining means, means for comparing the amplitude of said first signal and that of the output from said servo generator, said comparing means generating a capture mode voltage when the inputs thereto are substantially equal, means for selectively applying the output of said further degenerative combining means as input to said servoamplifier and removing the position feedback signal from said uncorrected sensor as input to said servoamplifier in response to said capture mode voltage being effected, whereby said servomotor is driven at a rate proportional to the difference between said first signal and said generator output signal.

2. A system as defined in claim 1 comprising signal limiting means through which said first signal is applied prior to application to said further degenerative combining means.

3. A system as defined in claim 2 wherein said signal limiting means comprises a controlled limiter and means for effecting a time controlled limit function in said limiter from an initial limit proportional to the absolute value of said first signal at the initiation time of said capture mode voltage with a linear decrease to a predetermined limit in excess of zero over a predetermined period of time.

4. A system as defined in claim 3 wherein said controlled limiter is voltage controlled and comprises a control voltage source; said control voltage source comprising a linear sweep generator, means for establishing an initial control voltage proportional to the absolute value of said first signal, means responsive to the initiation of said capture mode voltage to initiate a linear sweep from said initial control voltage to zero volts, and means responsive to the absence of said capture mode voltage to reset said sweep generator to the then existing absolute value of said first signal; and switching means for selectively applying the output from said linear sweep generator to said controlled limiter in response to generation of said capture mode voltage.

5. A system as defined in claim 4 further comprising means to selectively add a bias signal to said first signal as applied to said controlled limiter, said bias signal corresponding to a predetermined commanded altitude rate and being added when said first signal is essentially nulled.

6. A control system as defined in claim 5 further comprising a signal null detector receiving said first signal and being responsive to a zero input thereto to generate a track mode voltage, said means for selectively applying the output from said linear sweep generator to said controlled limiter being responsive to the presence of said track mode voltage to disconnect the linear sweep generator output voltage from said controlled limiter, said means for selectively applying said predetermined altitude rate bias signal to said first signal as applied to said controlled limiter being disabled by the presence of said track voltage, and said means for selectively connecting the output from said uncorrected altitude sensor as a control error signal to said autopilot control circuitry being enabled by said track mode voltage.

7. A system as defined in claim 6 further comprising switching means enabled by said capture mode voltage to selectively connect the output from said transducer to autopilot vertical guidance computation circuitry as a command error input thereto.

8. An altitude preselect and capture system for an aircraft comprising an uncorrected primary altitude sensor including an output transducer and an electromechanical input zero referencing mechanism, means for driving said zero referencing mechanism in accordance with the rotation of a servomotor, a position feedback signal taken from said sensor output transducer and applied as input signal to a servoamplifier driving said servomotor whereby said altitude sensor is driven at a rate proportional to the actual altitude rate experienced by said craft, means for developing a commanded altitude rate signal proportional to the discrepancy between said preselected altitude and the actually experienced altitude as detected by a corrected SSEC altitude sensor, generator means driven by said servomotor and producing an output signal proportional to the altitude rate being experienced by said craft, signal combining means for developing a control signal proportional to the discrepancy between said commanded altitude rate signal and the output from said generator means, means for comparing said commanded altitude rate signal and the output from said generator means, said comparing means developing a capture mode output voltage when said commanded altitude rate and servo generator output signals are substantially equal, and switching means responsive to the development of said capture mode voltage to remove said position feedback from said servoamplifier and apply the output of said signal combining means as input to said servoamplifier, whereby said zero referencing mechanism is driven at a rate proportional to the discrepancy between said preselected altitude and the actual aircraft altitude as sensed by said corrected sensor, and output switching means responsive to said capture mode voltage to connect the output from said primary altitude sensor output transducer as a command input signal to utilization means effecting vertical guidance of said aircraft.

9. Means as defined in claim 8 wherein said commanded altitude rate signal is applied to signal limiting means prior to application to said comparator means and selective application to said servoamplifier means, said limiting means effecting a linearly decreasing limit on the signal applied thereto from an initial limit proportional to the discrepancy between said preselected altitude and said sensed altitude at the initiation time of said capture mode voltage.

10. A system as defined in claim 9 further comprising means whereby said linear decreasing limit is effected from said initial limit to a predetermined lower limit greater than zero.

11. A system as defined in claim 8 comprising a further source of commanded altitude rate signal, means for selectively applying one of said further source and said commanded altitude rate signals as input to said signal combining means, said switching means being additionally responsive to selected application of said further source signal to remove said position feedback from said servoamplifier and apply the output of said signal combining means as input to said servoamplifier, means for disabling said comparing means in response to selected application of said further source signal as input to said signal combining means, and said output switching means being additionally responsive to the selected application of said further source signal to apply the output from said primary altitude sensor output transducer as a command input signal to utilization means effecting vertical guidance of said aircraft.

12. An altitude rate control system for an aircraft comprising an uncorrected primary altitude sensor including an output transducer and an electromechanical input zero referencing mechanism, means for driving said zero referencing mechanism in accordance with the rotation of a servomotor, a position feedback signal taken from said sensor output transducer and applied as input signal to a servoamplifier driving said servomotor whereby said altitude sensor is driven at a rate proportional to the actual altitude rate experienced by said craft, a source of commanded altitude rate signal, generator means driven by said servomotor and producing an output signal proportional to the altitude rate being experienced by said craft, signal combining means for degeneratively combining said commanded altitude rate signal and the output from said generator means, means for selectively applying said source of commanded altitude rate signal to said signal combining means, switching means responsive to selected application of said command altitude rate signal to said signal combining means to remove said position feedback from said servoamplifier and apply the output of said signal combining means as input to said servoamplifier, whereby said zero referencing mechanism is driven at a rate proportional to the discrepancy between said commanded altitude rate signal and the actual aircraft altitude rate, and further means responsive to selected application of said command altitude rate signal to connect the output from said primary altitude sensor output transducer as a command input signal to utilization means effecting vertical guidance of said aircraft.

* * * * *